Feb. 1, 1938.   C. V. BRADY   2,106,867

LAMINATED MATERIAL

Filed April 22, 1935

Charles V. Brady,
Inventor,
Delor F. Haynes,
Attorney.

Patented Feb. 1, 1938

2,106,867

UNITED STATES PATENT OFFICE 2,106,867

LAMINATED MATERIAL

Charles V. Brady, Webster Groves, Mo., assignor to Bemis Bro. Bag Co., St. Louis, Mo., a corporation of Missouri Application April 22, 1935, Serial No. 17,584

1 Claim. (Cl. 154—50)

This invention relates to laminated materials, and with regard to certain more specific features, to laminated materials of an impervious nature.

Among the several objects of the invention may be noted the provision of a laminated material of the class described which is impervious to water, oil, grease, gasoline, and the like, as well as being resistant to the normal processes of decay; the provision of a laminated material of the class described which has substantial strength, and may be subjected to considerable stretching and bending without losing its impervious character; and the provision of a laminated material of the class described which is relatively simple in construction and hence economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

Figure 1:
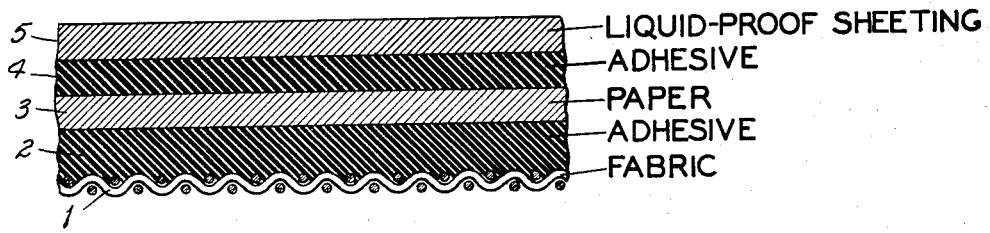
Figure 2:
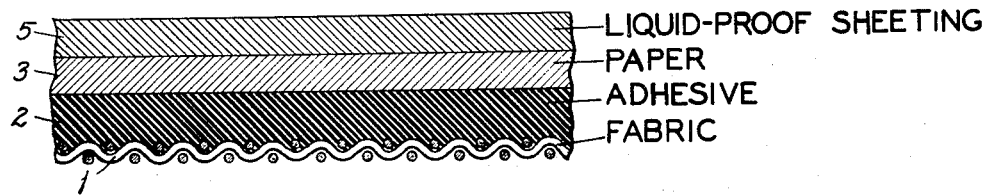

In the accompanying drawing, in which are illustrated several of various possible embodiments of the invention, Fig. 1 is an enlarged, diagrammatic cross section of a laminated material embodying the present invention; and, Fig. 2 is a section similar to Fig. 1 illustrating an additional embodiment of the invention.

Similar reference characters indicate corresponding parts throughout the several views of the drawing.

Referring now more particularly to Fig. 1, numeral 1 indicates a sheet or web of fabric, preferably, though not necessarily, burlap. Secured to the fabric layer 1 by a layer of adhesive 2 is a paper layer 3. The adhesive 2 desirably comprises a rubber type of adhesive such as self-curing or self-vulcanizing latex, although it may, within the scope of the invention, comprise other adhesive materials such as asphalt or the like. Asphalt cements are usually inferior to latex, however, when proofness to liquids such as gasoline is important. The paper layer 3 desirably comprises some form of relatively soft but strong paper. Crimped or creped paper has been found satisfactory for this purpose.

Secured to the upper face of the paper layer 3 by another layer of adhesive 4, is a layer of liquid-proof, transparent sheeting 5. The terms "liquid-proof sheeting" are used herein as indicative of a class of materials including a product recently placed upon the market by the Goodyear Tire and Rubber Company under the trade-mark "Pliofilm". Characteristics of said sheeting materials are their thinness, and substantial imperviousness to most liquids.

The "Pliofilm" hereinbefore referred to is a chlorinated rubber product, that is, it has a rubber base but is proof against attack by oils, greases and the like. Among its peculiar characteristics are its resiliency, or adaptability to stretching and bending. More important, however, is the water and grease-proofness of the "Pliofilm". It has been found through experimentation that the "Pliofilm" is substantially stable even in such a liquid medium as gasoline, which may be stored in a container lined with "Pliofilm" for days without any apparent effect upon the "Pliofilm".

The laminated material per se, shown in Fig. 1 has many points of superiority. The strength of the burlap or fabric layer 1, together with the paper layer 3, is maintained, and supplemented by the impervious character of the transparent sheeting layer 5. Further, the layer 5 gives the finished material a smooth, uniform surface which makes it more suitable for the packaging of certain materials.

The function of the paper layer 3 in the laminated material is as follows:

If the sheeting layer 5 is applied directly to the fabric layer 1, a product is obtained wherein there is a tendency when the fabric is put under stress, as in stretching, for the square interstices between the threads to deform to diamond shapes. This tendency applies local stresses to each area or diaphragm of transparent material adjacent such interstices. If distortion is great, this tends to break the transparent sheeting and thus disrupt the material. However, when the sheet of paper 3 is used, this paper has a tendency to buttress each of the rectangular interstices of the fabric to maintain the square shapes. The sheeting, being applied over the paper layer, thus receives a better distribution of the stresses and the unit stress on any one area is reduced, with a consequent reduction of breakage.

Particularly where the weave of the fabric is relatively open or loose, it is advisable to first apply the paper layer for bracing the fabric against distortion under biased or diagonal pulls, and then apply the "Pliofilm" layer.

A particular advantage of the "Pliofilm" is that it can be adhered to the paper, or fabric, without a special adhesive layer, if it be warmed to a proper temperature. Such a temperature is of the order of 220° to 270° F., and at this temperature the "Pliofilm" becomes soft and tenacious and can be adhered to the paper layer 3 merely by pressing them into close contact. In manufacture, such an attachment may be secured by means of heated calendering rolls or the like. This results in the product shown in Fig. 2, where it will be seen that the adhesive layer 4 is dispensed with. The product of Fig. 2 is otherwise identical with the product of Fig. 1.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

A laminated material comprising a layer of fabric having a relatively loose weave, a layer of paper adhered to said fabric, and a relatively thin film of chlorinated rubber material adhered to the other surface of the paper, said fabric supplying strength to the laminated material, while the paper buttresses the reticulations of the fabric against diagonal stretching, and the said chlorinated rubber material being capable of yielding to an extent sufficient to adhere to the paper even when the paper is stretched in buttressing the fabric as aforesaid, thereby to maintain the laminated material liquid-proof even while in use.

CHARLES V. BRADY.